United States Patent [19]
Kerko et al.

[11] Patent Number: 5,405,811
[45] Date of Patent: Apr. 11, 1995

[54] ULTRAVIOLET ABSORBING, FIXED TINT GREEN SUNGLASS

[75] Inventors: David J. Kerko; David W. Morgan, both of Corning, N.Y.

[73] Assignee: Corning Incorporated, Corning, N.Y.

[21] Appl. No.: 202,777

[22] Filed: Feb. 28, 1994

[51] Int. Cl.⁶ .................... C03C 3/091; C03C 4/08
[52] U.S. Cl. ........................... 501/66; 501/67; 501/70; 501/905
[58] Field of Search ............... 501/65, 66, 67, 70, 501/905

[56] References Cited

U.S. PATENT DOCUMENTS

| | | | |
|---|---|---|---|
| 2,937,952 | 5/1960 | Smith et al. | 501/70 |
| 5,256,607 | 10/1993 | Kerko et al. | 501/65 |
| 5,268,335 | 12/1993 | Kerko et al. | 501/905 X |

Primary Examiner—Karl Group
Attorney, Agent, or Firm—C. S. Janes, Jr.

[57] ABSTRACT

This invention is directed to a transparent glass which, at a thickness of 2 mm, transmits less than 1% of ultraviolet radiation having a wavelength of 380 nm and exhibits a green fixed tint bounded by apices A,C,D,E,A of the drawing, a purity between 18–32%, and a dominant wavelength between 554–564 nm, said glass having a composition consisting essentially, expressed in terms of weight percent on the oxide basis, of

| | | | |
|---|---|---|---|
| $SiO_2$ | 65–72 | $Na_2O + K_2O$ | 15–21 |
| $B_2O_3$ | 3–8 | CaO | 0–4 |
| $Al_2O_3$ | 0.5–5 | ZnO | 0–9 |
| $Na_2O$ | 6–12 | CaO + ZnO | 1–5 |
| $K_2O$ | 6–12 | $Fe_2O_3$ | 4.8–7. |

4 Claims, 1 Drawing Sheet

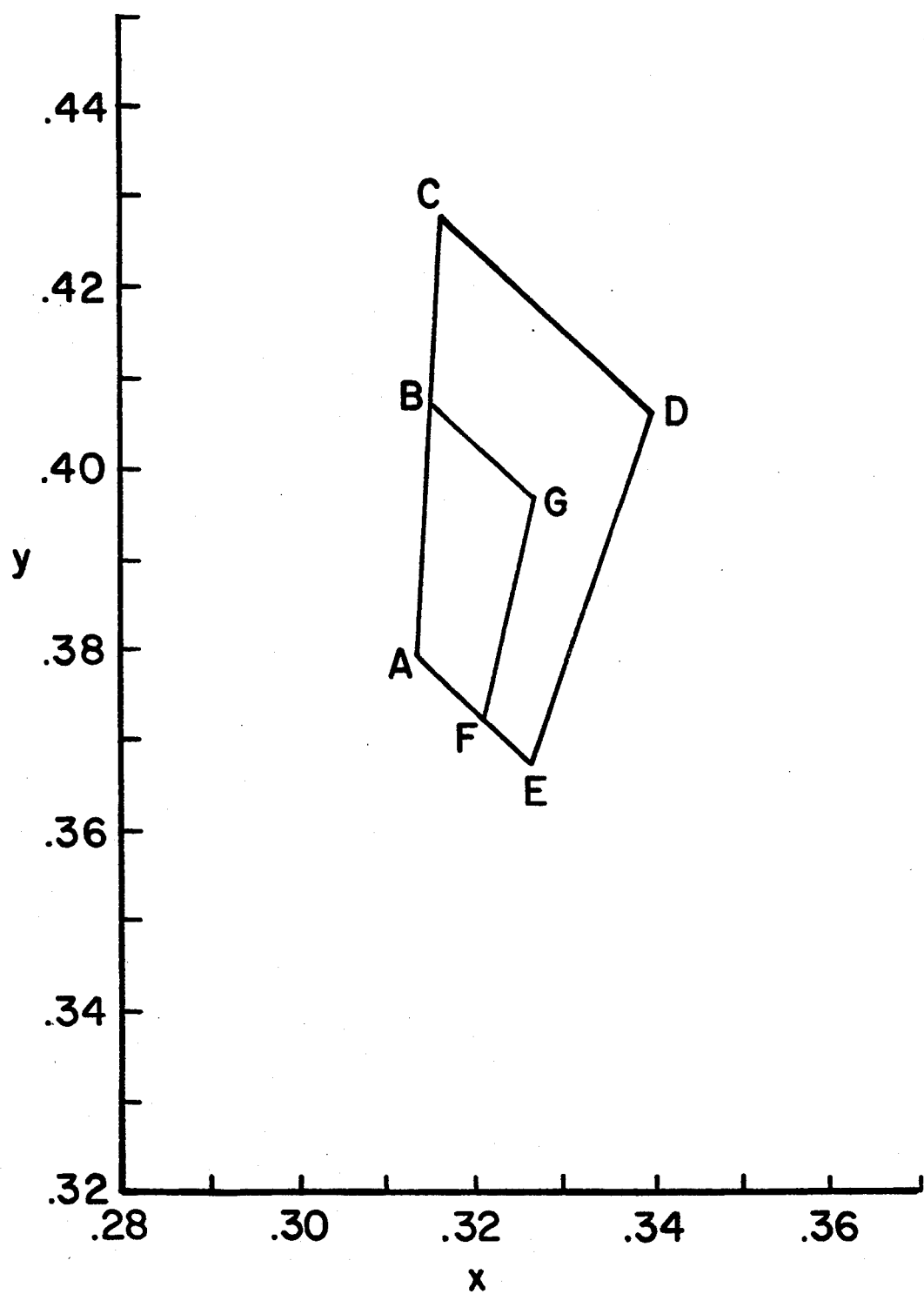

ULTRAVIOLET ABSORBING, FIXED TINT GREEN SUNGLASS

RELATED APPLICATION

U.S. application Ser. No. 08/202,774, filed concurrently herewith and assigned to the same assignee as the present application by D. J. Kerko, W. R. Lozano, and D. W. Morgan under the title ULTRAVIOLET ABSORBING, FIXED TINT BROWN SUNGLASS, discloses glasses designed for ophthalmic applications which, at a thickness of 2 mm, transmit less than 1% of ultraviolet radiation having a wavelength of 380 nm and which exhibit a brown coloration having a dominant wavelength between 580–588 nm and a purity between 48–70%. The glasses consist essentially, expressed in terms of weight percent on the oxide basis, of

| $SiO_2$ | 65–72 | CaO | 0–5.5 |
|---|---|---|---|
| $B_2O_3$ | 3–8 | ZnO | 0–4 |
| $Na_2O$ | 6–10 | CaO + ZnO | 2–5.5 |
| $K_2O$ | 7–12 | $Fe_2O_3$ | 3–5 |
| $Na_2O + K_2O$ | 15–20 | Se | 0.01–2 |
| $Al_2O_3$ | 0–4 | NiO | 0–0.12. |

BACKGROUND OF THE INVENTION

In recent years both governmental and private agencies have stressed the damage which can result when eyes are exposed to bright sunlight, this damage being caused primarily by exposure to wavelengths in the ultraviolet portion of the radiation spectrum. Therefore, glass manufacturers have been active in designing compositions for sunglasses which will essentially block the transmittance of ultraviolet radiation. U.S. Pat. No. 5,256,607 (Kerko et al.) and U.S. Pat. No. 5,268,335 (Kerko et al.) provide two disclosures directed to the production of such glasses.

U.S. Pat. No. 5,256,607 describes glass compositions suitable for use as sunglasses which exhibit a neutral gray, fixed tint coloration and limit the transmittance of ultraviolet radiation at a wavelength of 380 nm to no more than 1% at a thickness of 2 mm. The glass compositions are preferably essentially free of ZnO and consist essentially, expressed in terms of weight percent on the oxide basis, of

| $SiO_2$ | 65–72 | $K_2O:Na_2O$ | 1.25–2.25 | $As_2O_3$ | 0–0.3 |
|---|---|---|---|---|---|
| $B_2O_3$ | 2–6 | $Al_2O_3$ | 0–2.25 | $Fe_2O_3$ | 4.8–6.2 |
| $Na_2O$ | 6–10 | CaO | 0–1.5 | $Co_3O_4$ | 0.012–0.02 |
| $K_2O$ | 10–16 | $Al_2O_3$ + | 0–1.5 | NiO | 0.16–0.21. |
| $Na_2O + K_2O$ | 17–23 | CaO | | | |

The high concentration of iron provided the required absorption of ultraviolet radiation. Cobalt and nickel were added to adjust the chromaticity of the glass to a neutral gray target. $Al_2O_3$, $B_2O_3$, and/or CaO were included to assist in suppressing the transmittance of the glass at a wavelength of 380 nm to below 1% at a thickness of 2 mm.

U.S. Pat. No. 5,268,335 discloses the fabrication of ophthalmic lenses which can be chemically strengthened to high values with surface compression layers of substantial depth through short ion exchange treatments. Those glasses also restrict the transmittance of ultraviolet radiation at 380 nm to no more than 1% at a thickness of 2 mm. Iron was utilized to achieve the demanded low transmittance of ultraviolet absorption and, where a neutral gray coloration was desired, cobalt and nickel were included. The base compositions therefor were preferably free of ZnO and consisted essentially, expressed in terms of weight percent on the oxide basis, of

| $SiO_2$ | 55–65 | $Na_2O$ | 6–18 | MgO | 0–4 |
|---|---|---|---|---|---|
| $B_2O_3$ | 5–20 | $K_2O$ | 2–10 | $ZrO_2$ | 0–7 |
| $Al_2O_3$ | 4–10 | $Li_2O$ + | 13–22 | MgO + | 0–10 |
| $B_2O_3$ + | 14–26 | $Na_2O$ + | | $TiO_2$ + | |
| $Al_2O_3$ | | $K_2O$ | | $ZrO_2$ | |
| $Li_2O$ | 0–3 | CaO | 0–1.5 | $As_2O_3$ | 0–0.5 |
| | | MgO | 0–4 | ZnO | 0–1.5. |

Where other tints are desired in the glass, the patent cited the use of $Co_3O_4$, $Cr_2O_3$, CaO, $Fe_2O_3$, $MnO_2$, NiO, $V_2O_5$, Au, Pd, and rare earth metal oxides.

The patent also disclosed a glass commercially marketed by Corning Incorporated, Corning, N.Y., which exhibits a neutral gray fixed tint and limits the transmittance of ultraviolet radiation at 380 nm to no more than 1% at a thickness of 2 mm. An analysis of the glass, marketed under Corning Code 8015, is tabulated below, expressed in terms of weight percent on the oxide basis:

| $SiO_2$ | 68.41 | $K_2O$ | 9.71 | $Co_3O_4$ | 0.021 |
|---|---|---|---|---|---|
| $Al_2O_3$ | 0.51 | ZnO | 6.76 | NiO | 0.126 |
| $Na_2O$ | 8.81 | $Fe_2O_3$ | 5.54 | $As_2O_3$ | 0.111. |

There has been a need for a glass suitable for ophthalmic applications exhibiting a green fixed tint of a desirable hue that can be chemically strengthened to high values with surface compression layers of significant depth, and which limits the transmittance of ultraviolet radiation at 380 nm to less than 1% at a thickness of 2 mm.

Glasses displaying green colorations have been known for many years. In his monograph entitled "Coloured Glasses", Dawson's of Pall Mall, London, 1959, W. A. Weyl discusses the utility of the ions of chromium, cobalt, copper, vanadium, and praseodymium in producing green glasses. He also examined the palette of colors, including greenish hues, which result from the combination of $Fe^{+2}$ and $Fe^{+3}$ ions in the glass.

U.S. Pat. No. 2,937,952 (Smith et al.) discloses green glasses suitable for ophthalmic applications wherein the green coloration is imparted thereto through the inclusion of 2.8–5% $Fe_2O_3$. The patent noted that, although the total iron was reported as $Fe_2O_3$, the presence of both $Fe^{+2}$ and $Fe^{+3}$ was acknowledged. The glasses consisted essentially, in weight percent, of

| $SiO_2$ | 65–75 | CaO | 5–8 |
|---|---|---|---|
| $Na_2O$ | 7–10 | MgO | 2–4 |
| $K_2O$ | 7–10 | CaO + MgO | 7–10.5 |
| $Na_2O + K_2O$ | 15.5–17.5 | $Fe_2O_3$ | 2.8–5. |

U.S. Pat. No. 5,268,335, supra, explained that the incorporation of substantial quantities of CaO in a glass composition has customarily been observed to retard the ion exchange taking place between potassium ions from a salt bath and sodium ions present in the glass surface. That action of CaO leads to a shallower depth of the surface compression layer even after relatively long exchange periods such that, whereas providing a very substantial initial improvement in mechanical strength, considerable reduction in strength can result as a consequence of surface abuse suffered by the glass during use in service. The glasses described by Smith et al. contain substantial levels of CaO.

Corning Code 8053 glass, marketed by Corning Incorporated, exhibits a green hue and absorbs very strongly in the ultraviolet portion of the radiation spectrum. Both the color and the ultraviolet absorption are primarily the result of the high level of iron present in the glass, which glass consists essentially, as analyzed in weight percent as expressed on the oxide basis, of

| $SiO_2$ | 67.0 | $K_2O$ | 13.1 |
|---|---|---|---|
| $B_2O_3$ | 7.5 | ZnO | 2.5 |
| $Al_2O_3$ | 2.0 | $TiO_2$ | 1.0 |
| $Na_2O$ | 2.4 | $Fe_2O_3$ | 5.1. |

Unfortunately, because the $Na_2O$ content is low, the glass does not perform well when subjected to chemical strengthening in the standard commercial white crown glass salt bath; i.e., immersion for 2 to 16 hours in a bath of molten $KNO_3$ operating at a temperature of 450° C. Thus, there are insufficient $Na^+$ ions in the glass surface to exchange with $K^+$ ions from the salt bath so as to produce a surface compression layer of significant thickness.

Glass RB-3, marketed by Schott Glaswerk, Mainz, Germany, displays a green color and absorbs very strongly in the ultraviolet portion of the radiation spectrum. In like manner to Corning Code 8053 glass, supra, both the color and the ultraviolet absorption are due primarily to the high level of iron included in the glass composition, that composition consisting essentially, as analyzed in weight percent on the oxide basis, of

| $SiO_2$ | 72.6 | CaO | 4.4 |
|---|---|---|---|
| $Al_2O_3$ | 0.54 | $As_2O_3$ | 0.12 |
| $Na_2O$ | 10.6 | $Fe_2O_3$ | 5.76. |
| $K_2O$ | 6.0 | | |

That glass encounters problems in chemical strengthening on two counts. It contains a substantial amount of CaO and its strain point is below 450° C. The retarding effect which CaO exerts on the ion exchange reaction comprising the basis of chemical strengthening was explained above. To cause a compression surface layer to develop, the strain point of the glass must be higher than the temperature of the salt bath; in this instance, higher than 450° C. Otherwise, the bath temperature will cause the glass surface to relax such that compressive stresses are not built up therein.

Accordingly, the principal objective of the present invention was to devise glass compositions suitable for ophthalmic applications which exhibit a fixed green tint, which exhibit a transmittance to ultraviolet radiation at a wavelength of 380 nm of less than 1%, which will exhibit a transmittance having a dominant wavelength between 554–564 nm with a purity of 18–32%, which exhibit a refractive index of 1.523, and which can be chemically strengthened.

BRIEF DESCRIPTION OF THE DRAWING

The appended drawing comprises a plot of chromaticity coordinates on a color mixture diagram utilizing Illuminant C.

SUMMARY OF THE INVENTION

That objective can be achieved in glasses having base compositions consisting essentially, expressed in terms of weight percent on the oxide basis, of

| $SiO_2$ | 65–72 | $Na_2O + K_2O$ | 15–21 |
|---|---|---|---|
| $B_2O_3$ | 3–8 | CaO | 0–4 |
| $Al_2O_3$ | 0.5–5 | ZnO | 0–4 |
| $Na_2O$ | 6–12 | CaO + ZnO | 1–4 |
| $K_2O$ | 6–12 | $Fe_2O_3$ | 4.8–7. |

As employed herein, the expression "consisting essentially of" renders the glass composition open only for the inclusion of unspecified ingredients which do not materially affect the basic and novel characteristics of the glass. In general, the total of all such inclusions will be less than about 5%.

As was observed in U.S. Pat. No. 5,268,335, supra, optical and ophthalmic laboratories have been, and are continuing to be, under increasing governmental and private agency pressure to reduce the concentration of zinc released in the effluent created by their finishing operations. Therefore, whereas ZnO may be substituted for a part or all of the CaO, not only because of the above-described environmental concerns, but also because the redox conditions during melting require more exacting control with ZnO-containing glass melts, the preferred subject inventive glasses have compositions which are essentially free of ZnO. As used herein, "essentially free of ZnO" indicates that no substantial amount of a ZnO-containing material is intentionally included in the glass composition.

Quite surprisingly, the relatively substantial quantities of CaO in the inventive glasses do not appear to adversely affect their capability of being chemically strengthened, inasmuch as the phenomenon customarily encountered of the development of shallow surface compression layers has not been observed in the inventive glasses. It has been conjectured that the presence of $B_2O_3$ exerts some influence in securing surface compression layers of desirable depth.

When compared with Corning Code 8053 glass, the inventive glasses resulted from the replacement of part of the $K_2O$ with $Na_2O$, the substitution of CaO for ZnO, and the elimination of $TiO_2$ to obtain the desired green coloration. In general, the levels of $Na_2O$ and $K_2O$ will preferably be about equal.

With respect to Schott RB-3 glass, the inventive glasses contain substantial amounts of $B_2O_3$ and the levels of the remaining components, particularly those of $Na_2O$ and $K_2O$, are adjusted to assure that the strain points of the glasses exceed 460° C.

Arsenic oxide or a combination of alkali metal chloride and alkali metal bromide can comprise fining agents for the inventive glasses. For example, $As_2O_3$ in concentrations up to about 0.5% or a combination of chloride and bromide up to about 1.5% total, consisting of up to 1% chloride and up to 0.5% bromide, has been found to be quite satisfactory for that purpose. As can be appreciated, the use of this latter combination yields a much more reduced glass. Accordingly, compensation for that factor must be made by adjusting the ratio of the iron oxide batch materials; e.g., adjusting the ratio of iron oxalate to iron ($+3$ valence) oxide batch materials.

As was observed earlier, although the total iron content of the glass is reported in terms of $Fe_2O_3$, it is recognized that both $Fe^{+2}$ and $Fe^{+3}$ ions are present in the glass. Consequently, when iron constitutes the glass colorant, the oxidation state of the glass must be controlled in order to secure a desired tint. The appended drawing illustrates the "color box" of chromaticity coordinates (x,y), as determined employing a conventional tristimulus colorimeter with Illuminant C. Thus, the desired green tint lies within the area A,C,D,E,A of the drawing, with the preferred glasses exhibiting tints within the area A,B,G,F,A. As can be seen, in the basic glasses the dominant wavelength will range between 554–564 nm at a purity of 18–32%. In the preferred glasses the dominant wavelength will range between 554–560 nm at a purity of 18–26%.

The more preferred glasses consist essentially, expressed in terms of weight percent on the oxide basis, of

| $SiO_2$ | 66–72 | $K_2O$ | 6–11 |
|---|---|---|---|
| $B_2O_3$ | 3–7 | $Na_2O + K_2O$ | 15–20 |
| $Al_2O_3$ | 0.5–4 | CaO | 1–4 |
| $Na_2O$ | 6–11 | $Fe_2O_3$ | 5–7. |

As has been observed above, the use of iron as a colorant is well known to the art. With respect to the base compositions of the inventive glasses, it is believed that the two U.S. patents discussed in some detail above, plus the compositions of Corning Code 8053 glass and Schott RB-3 glass, comprise the most pertinent prior art.

DESCRIPTION OF PREFERRED EMBODIMENTS

Table I records several base glass compositions, expressed in terms of parts by weight on the oxide basis, illustrating the subject invention. Because, however, the sum of the individual components totals or closely approximates 100, for all practical purposes the values tabulated may be deemed to represent weight percent. The actual batch ingredients may comprise any materials, either oxides or other compounds, which, when melted together, will be converted into the desired oxide in the proper proportions. For example, $Na_2CO_3$ and $K_2CO_3$ can comprise a source of $Na_2O$ and $K_2O$ respectively. Because the oxidation state of the iron is vital to obtain the desired green tint in the glass, batch components which would place the glass in a reduced state will be avoided.

The batch ingredients were compounded, thoroughly blended together to aid in obtaining a homogeneous melt, and charged into platinum crucibles. The crucibles were moved into a furnace operating at about 1450° C., the batches melted for about 4 hours, the melts poured into steel molds to yield rectangular glass slabs having dimensions of about 25.4×10.2×1.3 cm (10"×4"×0.5"), and those slabs transferred immediately to an annealer operating at about 520° C.

Test samples were cut from the annealed slabs for measuring softening points, annealing points, linear coefficients of thermal expansion (25°–300° C.), densities, and indices of refraction. Measurements of chromaticity and transmittance at a wavelength of 380 nm were conducted on ground and polished plates of 2 mm thickness.

Whereas the description above is directed to laboratory melting and forming practice only, it must be appreciated that the glass compositions reported in Table I falling within the ranges of the present invention can be melted and formed in much larger quantities employing conventional commercial glass melting units with standard glass forming equipment and techniques. It is only necessary that glass batches of appropriate formulations be prepared, those batches fired at a temperature and for a time sufficient to secure homogeneous melts, and those melts thereafter cooled and shaped into glass articles of desired configurations. Customarily, those glass articles will be annealed.

TABLE I

|  | 1 | 2 | 3 | 4 | 5 | 6 | 7 |
|---|---|---|---|---|---|---|---|
| $SiO_2$ | 68.5 | 67.3 | 67.2 | 68.8 | 66.9 | 67.7 | 67.4 |
| $B_2O_3$ | 4.92 | 4.3 | 4.3 | 4.3 | 4.2 | 4.3 | 4.3 |
| $Al_2O_3$ | 2.2 | 1.9 | 1.9 | 0.5 | 1.9 | 1.9 | 1.9 |
| $Na_2O$ | 8.7 | 8.8 | 8.7 | 8.7 | 8.7 | 8.8 | 8.8 |
| $K_2O$ | 8.3 | 8.9 | 8.9 | 8.8 | 8.8 | 8.9 | 8.9 |
| CaO | 2.4 | 3.2 | 3.2 | 3.2 | 3.2 | 3.2 | 3.2 |
| $Fe_2O_3$ | 5.77 | 5.5 | 5.5 | 5.5 | 6.1 | 5.0 | 5.4 |
| $TiO_2$ | — | — | — | 0.23 | — | — | — |

As was explained above, the glass compositions of Table I can be fined using either $As_2O_3$ or a combination of chloride and bromide. Because the amounts remaining in the final glass are so small as to have a negligible effect upon the properties thereof, they have been omitted from Table I.

Table II records softening points (S.P.), annealing points (A.P.), and strain points (St.P), expressed in °C., linear coefficients of thermal expansion (Exp) over the temperature range 25°–300° C., expressed in terms of $\times 10^{-7}/°C.$, densities (Den), expressed in terms of $g/cm^3$, refractive indices ($n_D$), percent transmittance (Tran) at a wavelength of 380 nm at a thickness of 2 mm, and chromaticity values (Y,x,y) measured on polished samples of 2 mm thickness, all being measured employing techniques conventional in the glass art. Example 1 comprised the base glass composition for a study of the effects which excursions of iron content would have on the chromaticity values exhibited by the glass. Therefore, because the variations in levels of the base glass components were relatively minor, it was deemed that the physical properties of Examples 2–7, except for the chromaticity data, would be similar to those of Example 1 and, hence, were not measured.

TABLE II

|  | 1 | 2 | 3 | 4 | 5 | 6 | 7 |
|---|---|---|---|---|---|---|---|
| S.P. | 703 | — | — | — | — | — | — |
| A.P. | 528 | — | — | — | — | — | — |
| St.P | 494 | — | — | — | — | — | — |
| Exp | 85.7 | — | — | — | — | — | — |
| Den | 2.502 | — | — | — | — | — | — |
| $n_D$ | 1.523 | — | — | — | — | — | — |
| Tran | 0.13 | 0.22 | 0.21 | 0.58 | 0.07 | 0.53 | 0.36 |
| Y | 16.4 | 13.7 | 15.5 | 18.7 | 10.1 | 22.5 | 19.0 |
| x | 0.3284 | 0.3176 | 0.3341 | 0.3164 | 0.3314 | 0.3214 | 0.3264 |
| y | 0.3811 | 0.3868 | 0.3978 | 0.3792 | 0.4021 | 0.3802 | 0.3860 |

In the "color box" of the appended drawing, apices A,B,C,D,E,F, and G designate the following x,y coordinates.

|  | x | y |
|---|---|---|
| A | 0.3139 | 0.3791 |
| B | 0.3153 | 0.4073 |
| C | 0.3168 | 0.4278 |
| D | 0.3394 | 0.4061 |

-continued

|   | x | y |
|---|---|---|
| E | 0.3267 | 0.3668 |
| F | 0.3216 | 0.3718 |
| G | 0.3267 | 0.3965 |

As can be observed from the measurements reported in Table II and as graphically represented in the appended drawing, composition control of the inventive glasses is vital to assure that the glasses will demonstrate the chromaticities included within the polygon delineated by apices A,C,D,E,A, while limiting the transmittance of the glass at a wavelength of 380 nm to less than 1%. Even more critical, of course, is the control of glass composition within the preferred color target area bounded by apices A,B,G,F,A.

Ground and polished lens blanks having a cross section of about 2 mm were immersed for two hours in a bath of molten $KNO_3$ operating at 450° C. The lens blanks were extracted from the bath, the salt rinsed off in tap water, and dried. The samples were divided into two groups; the members of the first group being subjected to the American Optical tumbling procedure, the ophthalmic glass industry standard procedure for abrading lenses to simulate abuse during normal service, and the members of the second group not. Table III records whether the sample had been abraded prior to the test and the mean failure height (MFH) measured over a total of 25 samples of each glass, along with the standard deviation in the measurements (Std. Dev). The test involved dropping a steel ball having a diameter of about 1.6 cm (1.625") onto the center of the sample.

TABLE III

| Example | Abraded | MFH | Std. Dev |
|---|---|---|---|
| 1 | 2 hr | No | 6.64 m (21.8') | 1.31 m (4.3') |
| 1 | >2 hr | Yes | 3.66 m (12.0') | 1.31 m (4.3') |
| 1 | 16 hr | No | 6.93 m (29.3') | 1.92 m (6.3') |

TABLE III-continued

| Example | Abraded | MFH | Std. Dev |
|---|---|---|---|
| 1 | 16 hr | Yes | 4.69 m (15.4') | 1.76 m (2.5') |

It is immediately evident that the abraded strength illustrated by the chemically strengthened glasses of the present invention far exceeds the Federal Food and Drug Administration (FDA) "Drop Ball Test", which requires a sample to survive the impact from the above-described steel ball falling from a height of about 127 cm (50").

Example 1 is the most preferred embodiment.

We claim:

1. A transparent glass which, at a thickness of 2 mm, transmits less than 1% of ultraviolet radiation having a wavelength of 380 nm and exhibits a green fixed tint bounded by apices A,C,D,E,A of the drawing, a purity between 18-32%, and a dominant wavelength between 554-564 nm, said glass having a composition consisting essentially, expressed in terms of weight percent on the oxide basis, of

| $SiO_2$ | 65-72 | $Na_2O + K_2O$ | 15-21 |
|---|---|---|---|
| $B_2O_3$ | 3-8 | CaO | 0-4 |
| $Al_2O_3$ | 0.5-5 | ZnO | 0-4 |
| $Na_2O$ | 6-12 | CaO + ZnO | 1-5 |
| $K_2O$ | 6-12 | $Fe_2O_3$ | 4.8-7. |

2. A transparent glass according to claim 1 wherein said glass composition is essentially free of ZnO.

3. A transparent glass according to claim 1 exhibiting a green fixed tint bounded by apices A,B,G,F,A of the drawing, a purity between 18-26%, and a dominant wavelength between 554-560 nm, said glass consisting essentially of

| $SiO_2$ | 66-72 | $K_2O$ | 6-11 |
|---|---|---|---|
| $B_2O_3$ | 3-7 | $Na_2O + K_2O$ | 15-20 |
| $Al_2O_3$ | 0.5-4 | CaO | 1-4 |
| $Na_2O$ | 6-11 | $Fe_2O_3$ | 5-7. |

4. A transparent glass according to claim 2 wherein said glass composition is essentially free of ZnO.

* * * * *